US010171139B1

(12) United States Patent
Desclos et al.

(10) Patent No.: US 10,171,139 B1
(45) Date of Patent: Jan. 1, 2019

(54) INTER-DWELLING SIGNAL MANAGEMENT USING RECONFIGURABLE ANTENNAS

(71) Applicant: Ethertronics, Inc., San Diego, CA (US)

(72) Inventors: Laurent Desclos, San Diego, CA (US); Olivier Pajona, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 0 days.

(21) Appl. No.: 15/423,565

(22) Filed: Feb. 2, 2017

Related U.S. Application Data

(60) Provisional application No. 62/290,416, filed on Feb. 2, 2016.

(51) Int. Cl.
| | | |
|---|---|---|
| *H01Q 21/00* | (2006.01) | |
| *H04B 7/0426* | (2017.01) | |
| *H01Q 3/26* | (2006.01) | |
| *H01Q 3/24* | (2006.01) | |
| *H01Q 19/00* | (2006.01) | |
| *G06N 99/00* | (2010.01) | |
| *H04L 1/00* | (2006.01) | |

(52) U.S. Cl.
CPC ............ *H04B 7/043* (2013.01); *H01Q 3/247* (2013.01); *H01Q 3/2611* (2013.01); *H01Q 19/005* (2013.01); *G06N 99/005* (2013.01); *H04L 1/0003* (2013.01); *H04L 1/0026* (2013.01)

(58) Field of Classification Search
CPC ...... H01Q 21/00; H01Q 3/247; H01Q 3/2611; H01Q 19/005; H04B 7/043
USPC .......................................................... 343/835
See application file for complete search history.

(56) References Cited

U.S. PATENT DOCUMENTS

| | | |
|---|---|---|
| 6,765,536 B2 | 7/2004 | Phillips et al. |
| 6,987,493 B2 | 1/2006 | Chen |
| 7,068,234 B2 | 6/2006 | Sievenpiper |
| 7,187,949 B2 * | 3/2007 | Chang .................... H01Q 1/246 455/524 |
| 7,215,289 B2 | 5/2007 | Harano |
| 7,830,320 B2 | 11/2010 | Shamblin |
| 7,911,402 B2 | 3/2011 | Rowson et al. |
| 8,362,962 B2 | 1/2013 | Rowson et al. |
| 8,446,318 B2 | 5/2013 | Ali et al. |
| 8,648,755 B2 | 2/2014 | Rowson et al. |
| 8,717,241 B2 | 5/2014 | Shamblin et al. |
| 9,065,496 B2 | 6/2015 | Rowson et al. |
| 9,231,669 B2 | 1/2016 | Desclos et al. |
| 9,240,634 B2 | 1/2016 | Rowson et al. |
| 9,425,497 B2 | 8/2016 | Pajona et al. |

(Continued)

*Primary Examiner* — Huedung Mancuso
(74) *Attorney, Agent, or Firm* — Dority & Manning, P.A.

(57) ABSTRACT

A communication system utilizing reconfigurable antenna systems is described where beam steering and null forming techniques are incorporated to limit the region or volume available for communication with client devices. The communication system described restricts communication to defined or desired area and degrades signal strength coverage outside of a prescribed region. An algorithm is used to control the antenna system to monitor and control antenna system performance across the service area. This antenna system technique is applicable for use in communication systems such as a Local Area Network (LAN), cellular communication network, and Machine to Machine (M2M).

8 Claims, 6 Drawing Sheets

(56) References Cited

U.S. PATENT DOCUMENTS

| | | |
|---|---|---|
| 9,439,151 B2 | 9/2016 | Zhu et al. |
| 9,479,242 B2 | 10/2016 | Desclos et al. |
| 9,590,703 B2 | 3/2017 | Desclos et al. |
| 9,755,305 B2 | 9/2017 | Deslos et al. |
| 9,755,580 B2 | 9/2017 | Desclos et al. |
| 2002/0128044 A1* | 9/2002 | Chang .................... H01Q 1/246 455/562.1 |
| 2003/0030594 A1* | 2/2003 | Larry ..................... H01Q 11/08 343/895 |
| 2013/0237272 A1* | 9/2013 | Prasad ................ H04B 7/0617 455/517 |
| 2014/0169430 A1* | 6/2014 | Nilsson ................. H04B 7/043 375/227 |
| 2016/0099602 A1* | 4/2016 | Leabman ............... H02J 7/025 307/104 |

* cited by examiner

INTER-DWELLING SIGNAL MANAGEMENT USING RECONFIGURABLE ANTENNAS

CROSS-REFERENCE TO RELATED APPLICATIONS

This application claims benefit of U.S. Provisional Application Ser. No. 62/290,416, filed Feb. 2, 2016; the entire contents of which are hereby incorporated by reference.

BACKGROUND

Field of the Invention

This invention relates generally to the field of wireless communication; and more particularly, to a communication system configured to communicate with one or more client devices on a communication network, wherein the communication system is capable of constructing a customized communication zone, and only within the communication zone may the one or more client devices communicate with the communication system. In addition to the communication system, this invention further relates to methods for using the communication system.

Description of the Related Art

A proliferation of wireless communication systems such as wireless wide area networks (WWAN), also referred to as "cellular systems", and wireless local area networks (WLAN), have improved communication and provided benefits associated with real-time mobile voice communications and internet access in both homes and businesses.

WLAN, specifically, has been adopted across homes and businesses in many regions of the world; with a large number of client devices, such as but not limited to: smartphones, laptops, and tablets, being capable of WLAN transmission/reception. More recently, WLAN has been adopted for high throughput applications, such as, for example, video streaming for in-home applications. These WLAN communication systems require good performance from the RF radio and antenna system integrated therein in order to ensure quality operation. In addition, these WLAN communication systems becoming increasingly popular in homes correspondingly increase the signaling encountered in apartment buildings and neighborhoods. These in-home video streaming applications are offered by service providers who garner revenue per home, or customer, and there is a desired need to limit video streaming and internet access service for the exclusive use of the paying customer, and not to other un-intended users. Un-intended access of WLAN signals by these un-intended users will result in reduced revenue at the service provider as well as reduced capacity for the paying customer.

With the need for higher signal strengths or receive signal strength indicator (RSSI) levels in houses and apartments among other buildings, in order to support video streaming and other high data rate internet usage, such as gaming, the RF and antenna system performance will become more important in terms of providing strong RF signaling throughout the intended dwelling.

Unfortunately, with passive antennas used in WLAN systems there is no control over radiation pattern coverage and the field of view that the antenna system can cover once the WLAN enabled device, such as a gateway or access point, is placed in a house. At a fixed transmit power level and a fixed antenna radiation pattern the electromagnetic (EM) wave will propagate within the house or dwelling, and will continue to propagate through the exterior walls or confines of the dwelling. Blockage and absorption from the walls, door, and furniture in the dwelling will attenuate and disturb the EM wave, but some of the radiated energy will extend beyond the dwelling and into neighboring houses, apartments, and other places. If security measures are not implemented in the signaling, or if the service subscriber allows other residents in neighboring houses or apartments to access the signaling, for example, by providing the password for a specific access point or gateway, then decreased revenue for the service provider will result.

While the above represents one detailed issue in the art, it would be recognized by others with skill in the art that a myriad of similar and relatable problems also exist.

Whether an end-user desires to protect her signal from unintended users in adjacent dwellings, or whether a service provider desires to limit the spatial access from a particular communication system, there is a need for such a communication system that can be configured to communicate with one or more client devices on a communication network, wherein the communication system is capable of constructing a customized communication zone, and only within the communication zone may the one or more client devices communicate with the communication system, such that the signal access is restricted or confined within a desired space.

SUMMARY

In one aspect, a communication system is described. The communication system is configured to communicate with one or more client devices on a communication network, wherein the communication system is capable of constructing a customized communication zone, and only within the communication zone may the one or more client devices communicate with the communication system.

In another aspect, methods are provided which relate to use of the communication system described above.

These and other aspects, embodiments and variations will be further appreciated by those having skill in the art upon a thorough review of the enclosed description and the appended drawings.

DESCRIPTION OF THE INVENTION

Figure 1:
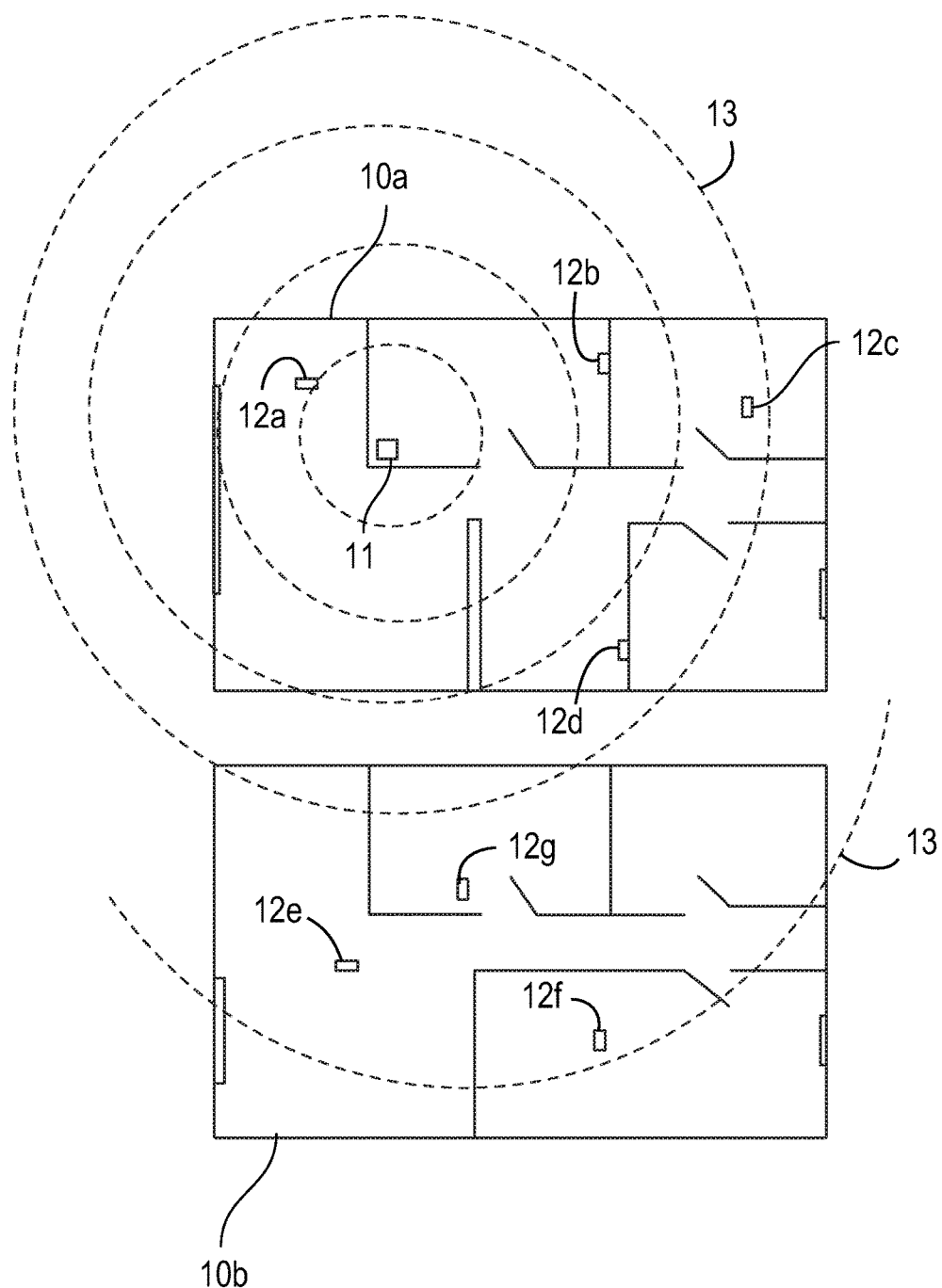
FIG. 1 shows an access point located within a first house, a radiated signal from the access point is shown throughout the first house and further extending into a second house, wherein each of the houses contains client devices capable of communicating with the access point.

An communication system with integrated reconfigurable antenna system is disclosed that provides reconfigurable radiation modes and an algorithm that tasks the antenna system to provide good RF signal strength coverage for a defined region while minimizing RF field strength external to the defined, preferred region. A training session initiated at hardware installation in a home or other dwelling is described where measurements are performed to map signal strength within the dwelling across various radiation modes of the reconfigurable antenna system, with this information used in conjunction with the algorithm to service wireless clients in the dwelling or region. This new system level approach is applicable to a wide variety of communication systems including WLAN in homes, apartments, and businesses.

A reconfigurable antenna system is described, wherein antenna beam steering hardware is combined with an algorithm to optimize RF signal strength when coupled to a radio within a defined region such as a house or apartment while minimizing RF signal strength exterior to the region. This process is performed by generating multiple radiation modes that can be used to illuminate the defined region and tracking RF signal strength or other metric per mode throughout the region. The algorithm is tasked with determining which radiation mode provides adequate communication system performance at exterior boundaries or walls of the desired region to provide communication coverage while reducing RF signal strength exterior to the boundary of this desired region. Radiation modes selected for use with client devices at the boundary of the region might not provide the highest data Throughput but instead the mode used might be chosen to provide a Throughput at a specific value or range of values to service the client at the boundary, with this radiation mode providing lower Throughput or signal strength outside of the desired region. The various radiation modes generated by the reconfigurable antenna system will have different radiation pattern shapes and/or polarization properties when compared to each other. The mode selection process will take into account the desire to service a client device at a set signal strength level, with this signal strength level capable of supporting a desired modulation coding scheme for example, while minimizing signal strength levels exterior to the region that communication is desired.

Certain embodiments describe a communication system, such as an access point or similar device, configured to utilize reconfigurable antenna systems within, such that beam steering and null forming techniques are implemented in order to construct a finite space available for communication between the system and one or more client devices networked. This antenna system technique is applicable for use in communication systems such as a Local Area Network (LAN), cellular communication network, and Machine to Machine (M2M).

In one embodiment, a WLAN radio with reconfigurable antenna system is used for communication in a house. The client devices used with this WLAN radio have fixed locations, for example client devices located at each television in the house used for video streaming of content from the WLAN radio. At installation of the WLAN radio and client devices the reconfigurable antenna system with algorithm can be run through a training session where the multiple radiation modes of the reconfigurable antenna are transmitted and radiated performance at each client device is measured and stored. This radiated performance can be measured in the form of signal strength such as RSSI, Signal to Interference and Noise Ratio (SINR), Modulation Coding Scheme (MCS), Channel Quality Indicator (CQI), or some other metric. If radiated performance measurements can be conducted using a client device external to the intended region, such as outside the exterior walls of a house or in the apartment adjacent to an apartment selected for the communication system, then the measurements are performed to determine signal strength levels exterior of the intended region per radiation mode. For this static situation where client devices are intended to be stationary the radiation mode that provides a set level of performance per client can be selected and assigned for use during system operation. The algorithm can sample additional modes during operation to verify that the mode selected is optimal for a set level of communication link performance. The goal of the reconfigurable antenna system with algorithm working in conjunction with the WLAN radio is to provide a specific signal strength at a client device within an intended region such as a house or apartment while minimizing signal strength external to the intended region, i.e. on the other side of an exterior wall. Radiation modes are selected not to optimize signal strength in the intended region but to provide an adequate or required signal strength in the desired region and low signal strength external to the region.

In another embodiment, the scenario previously described is implemented where a WLAN radio and reconfigurable antenna system with algorithm is used to provide service to a house or apartment. Instead of fixed clients the clients can now be mobile. For example, instead of clients positioned at televisions within the house or apartment the clients are laptops and smartphones used by residents moving about the dwelling. In this case the algorithm performs the same optimization function in terms of restricting signal strength levels exterior to the dwelling but the modes are sampled more frequently to compensate for a changing propagation channel.

In another embodiment, a training session is performed, with the training session consisting of measurements performed at multiple locations internal and if possible, external to the region or dwelling where communication is desired. Previously described metrics such as RSSI or SINR are mapped as a function of location to determine modes that can support a set level of communication system performance as well as modes that will reduce signal strength external to the region or dwelling.

In another embodiment, a unique identifier for WLAN radios used as clients and for access points, such as a MAC address, can be inventoried for the communication system formed by access points and client devices. For closed systems such as video streaming wireless systems that have specific access points or gateways that stream to a fixed number of client devices within a house or other dwelling the signal strength at client devices can be increased by selecting the optimal radiation mode of the reconfigurable antenna system while the signal strength at clients that are not a part of the intended communication system can be reduced by choosing radiation modes that suppress or "null out" the unintended client device. This system level approach can be used to degrade WLAN quality to client devices that are not part of the intended system, as when a customer of a video streaming service to allow access to the video stream to neighbors who are not customers of the service. This technique will minimize revenue loss of service providers by reducing usage of their services by users who are not customers.

The following invention describes a system for restricting radiated field strength to allow the capability to service clients within a specified region and to reduce the field strength at clients located external to the specified region. A method is also described where unique radio identifiers at the clients allow for radiation mode selection of the reconfigurable antenna system at the serving radio to select radiation modes that improve signal strength at desired clients and reduces signal strength at clients with unique identifiers that do not correspond to identifiers on a preferred list.

Now turning to the drawings, FIG. 1 illustrates a first house 10a where an access point 11 is located in a first room of the house, with the access point used to communicate with four clients 12a; 12b; 12c; and 12d, respectively, within the first house. The radiated signal 13 from the access point 11 also propagates into a second house 10b, which is adjacent to the first house 10a. Three clients 12e; 12f; and 12g within the second house 10b are within the radiated field 13 of the access point 11 located in the first house 10a.

Figure 2:
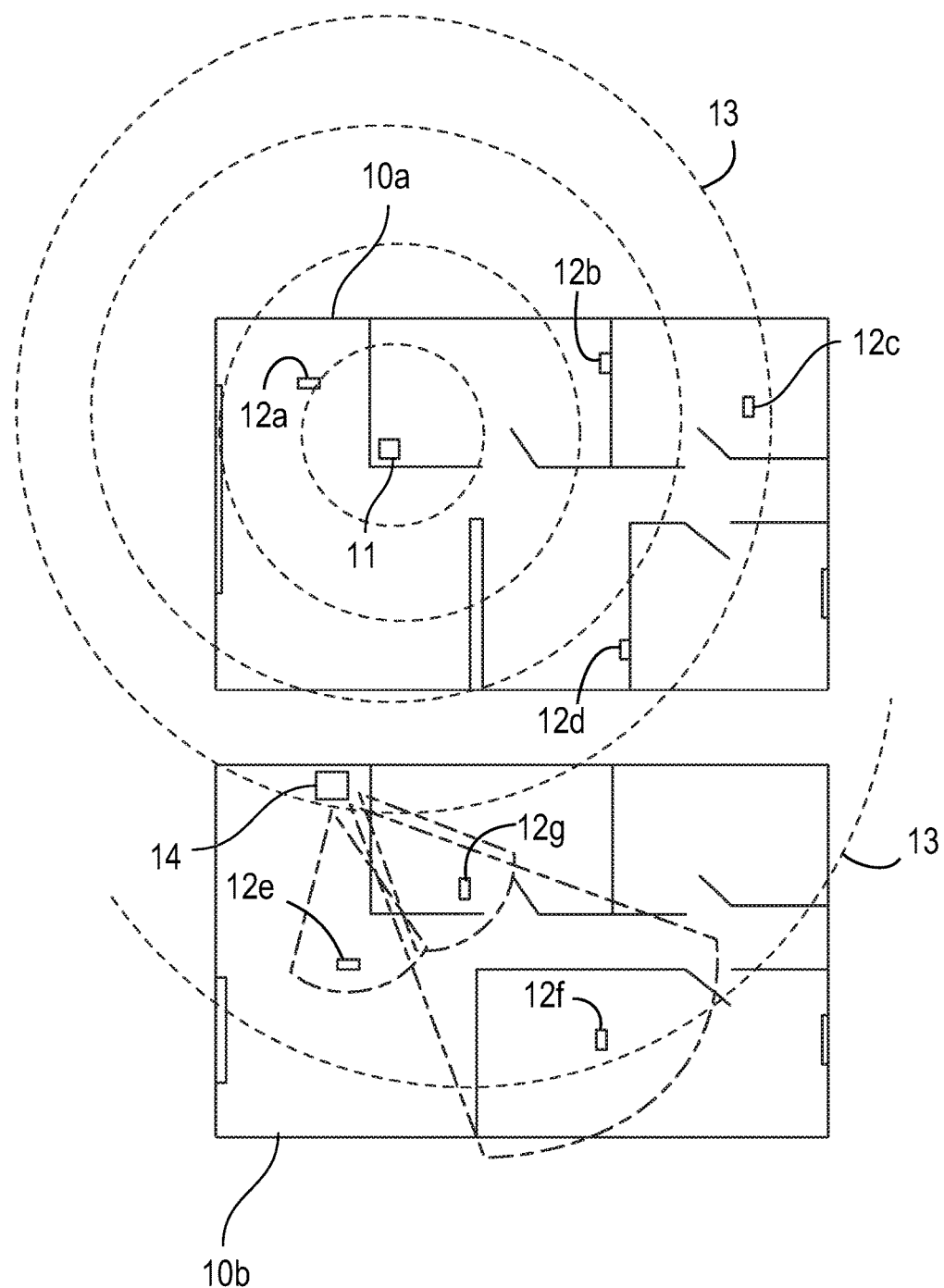
FIG. 2 shows an access point located within a first house, a radiated signal from the access point is shown throughout the first house and further extending into a second house, wherein each of the houses contains client devices capable of communicating with the access point; wherein a repeater is introduced in the second house to enhance the signal for communication with devices in the second house.

FIG. 2 illustrates a first house 10a where an access point 11 is located in a first room of the house, with the access point used to communicate with four clients 12a; 12b; 12c; and 12d, respectively, within the first house. The radiated signal 13 from the access point 11 also propagates into a second house 10b, which is adjacent to the first house 10a. Three clients 12e; 12f; and 12g within the second house 10b are within the radiated field 13 of the access point 11 located in the first house 10a. Here, a repeater circuit 14 is provided in the second house at a position nearest the access point 11 of the first house. The repeater circuit 14 receives and re-broadcasts the information from the access point 11 to clients 12e; 12f; and 12g within the second house.

Figure 3:
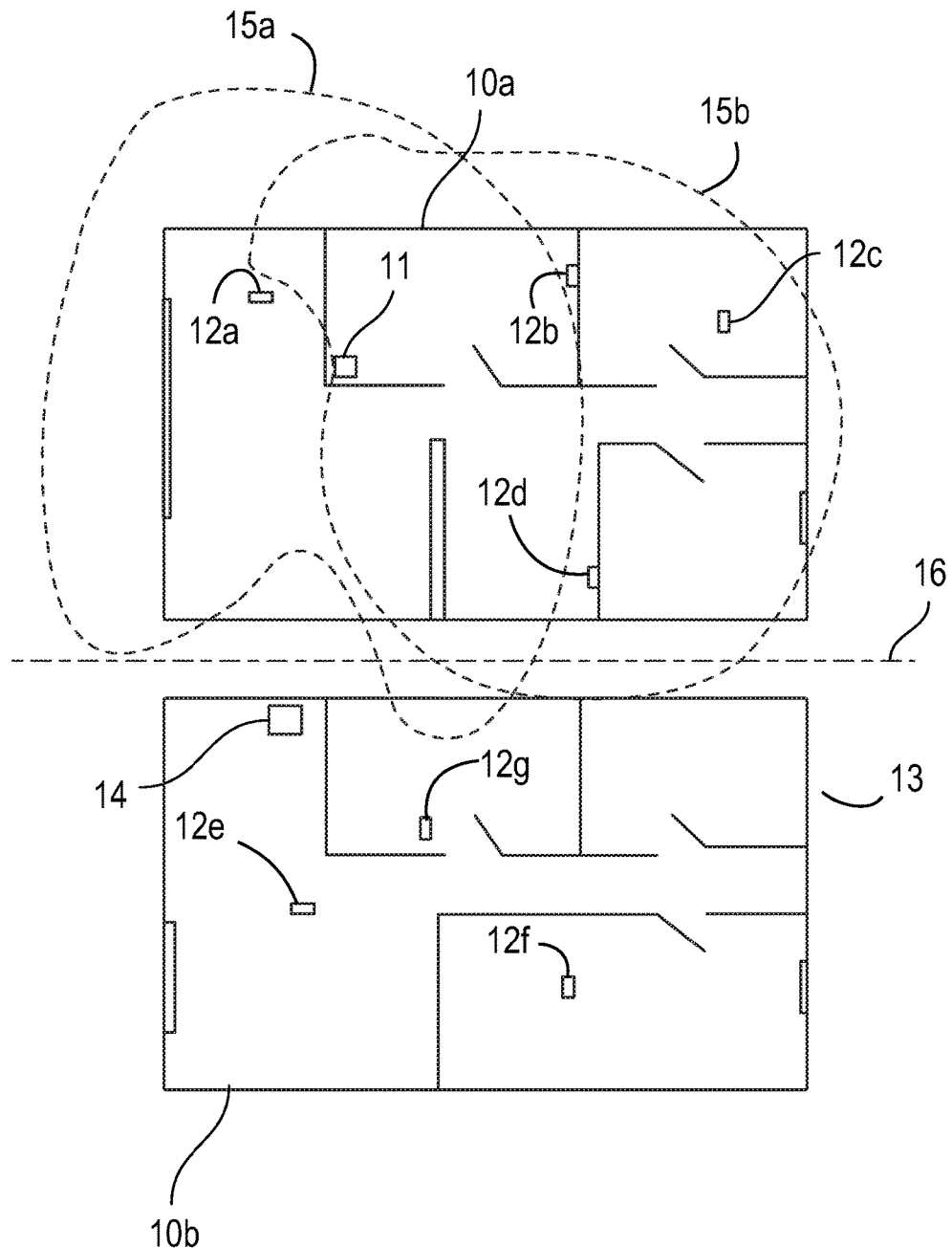
FIG. 3 shows an access point with integrated reconfigurable antennas, the reconfigurable antennas are adjusted to create two radiation patterns suitable for signal coverage throughout the first house, but not adequate for communication in the second house.

FIG. 3 illustrates an embodiment similar to that of FIG. 1, including a first house 10a where an access point 11 is located, with this access point containing a reconfigurable antenna system which can generate multiple radiation patterns, or modes. Two radiation modes are shown, a first radiation pattern mode 15a and a second radiation pattern mode 15b, with these two modes capable of illuminating client devices within the first house 10a, but with reduced signal strength at client devices located in the adjacent second house 10b. A receive signal strength indicator limit line is shown, wherein the access point 11 is configured to limit the signal strength beyond the limit line.

Figure 4:
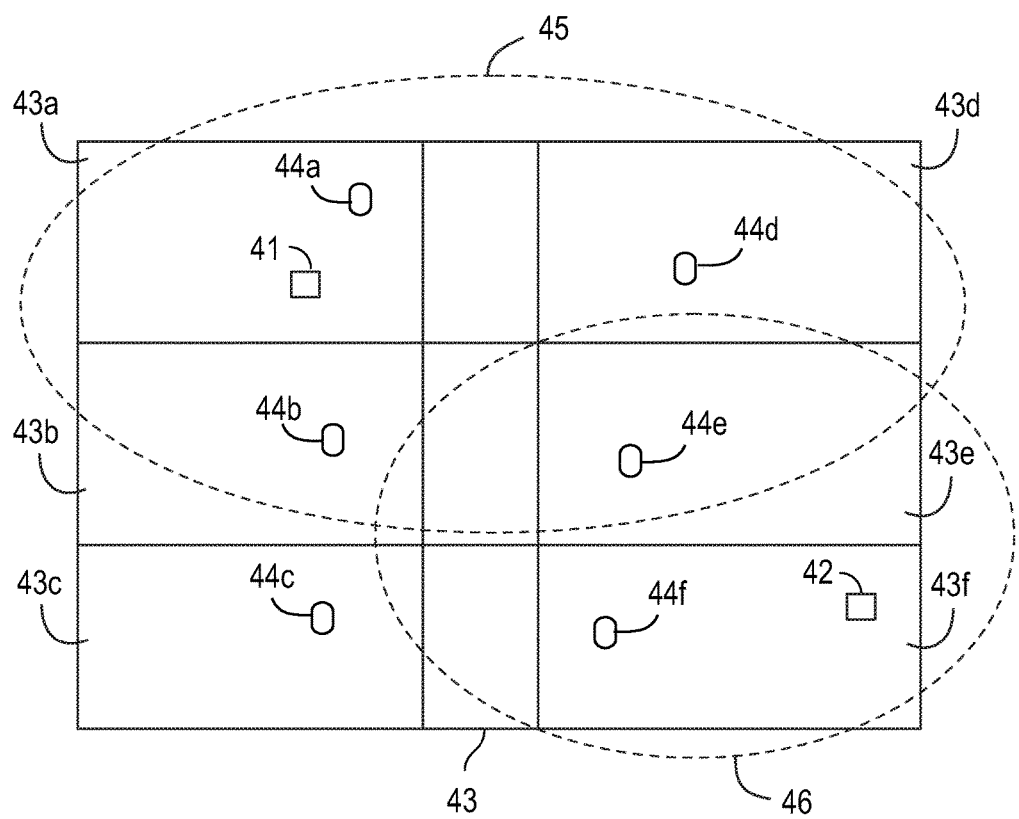
FIG. 4 shows an apartment building with six apartments, a first access point with passive antennas produces a first radiation pattern, and a second access point with passive antennas produces a second radiation pattern, the first access point is capable of communicating with four clients in four apartments, respectively, whereas the second access point is capable of communicating with two other client devices within two other apartments; the illustrated schematic results in lost revenues for service providers and reduced capacity for the paying subscriber.

FIG. 4 illustrates a multi-story apartment building 43 where two access points are located, one in each of the two apartments. The radiated RF field from the access points illuminates client devices located in multiple apartments in the building. A first access point 41 serves four client devices 44a; 44b; 44d; and 44e, respectively, with first radiation pattern 45 spanning four apartments 43a; 43b; 43c; and 44d of six shown apartments of the apartment building 43. A second access point 42 serves two client devices 44c and 44f, with second radiation pattern 46 spanning two apartments 43e; 43f of the six apartments of the apartment building 43. Passive antenna systems are used in the access points in this drawing, with no method of controlling radiation patterns to suppress radiation in un-desired regions, resulting in a loss of revenues for service providers and reduced link budget capacity for paying subscribers.

Figure 5:
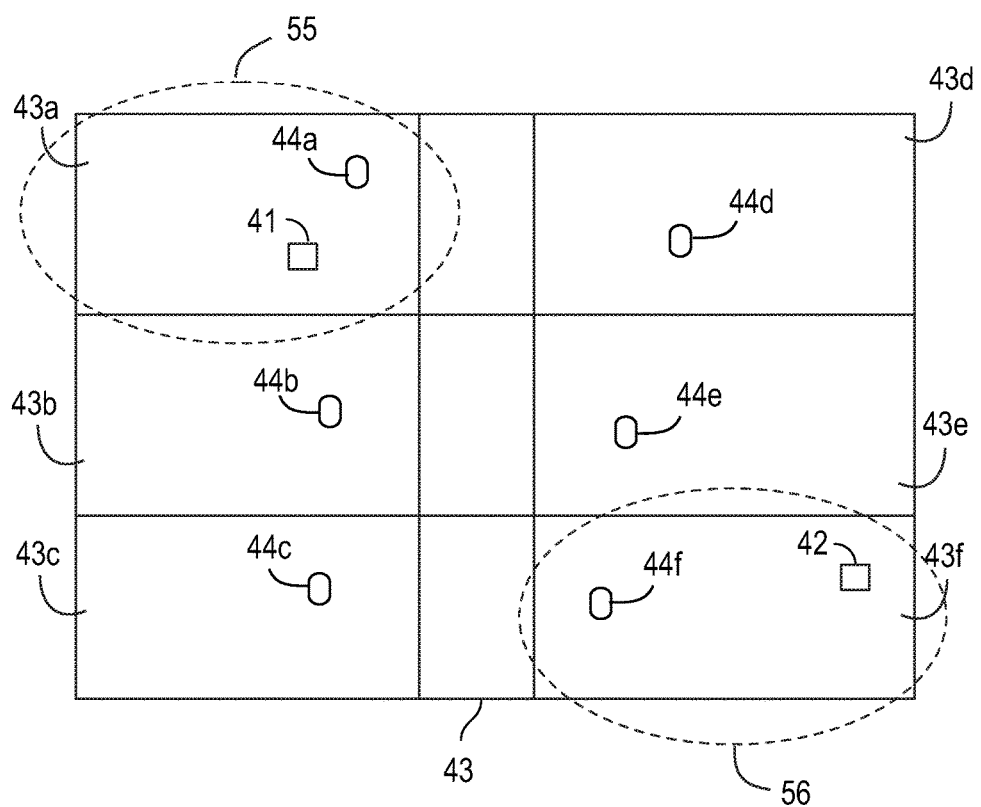
FIG. 5 shows the same apartment building as described in FIG. 4, however, each access point includes a reconfigurable antenna system capable of adjusting its respective antenna radiation pattern mode; the illustrated schematic results in reduced losses attributed to unintended users.

In contrast to that shown in FIG. 4, FIG. 5 illustrates a multi-story apartment building 43 where the two access points 41 and 42, respectively, are located in two 43a; 43f of the six apartments. Each of the six apartments has a client device 44a; 44b; 44c; 44d; 44e; and 44f located within. Each access point has a reconfigurable antenna system capable of generating multiple radiation modes. This capability allows for restricting the RF signal strength from the radiated fields of the access points from providing adequate signal strength to clients in adjacent apartments within the building; i.e. the un-desired client devices or un-desired regions.

Figure 6:
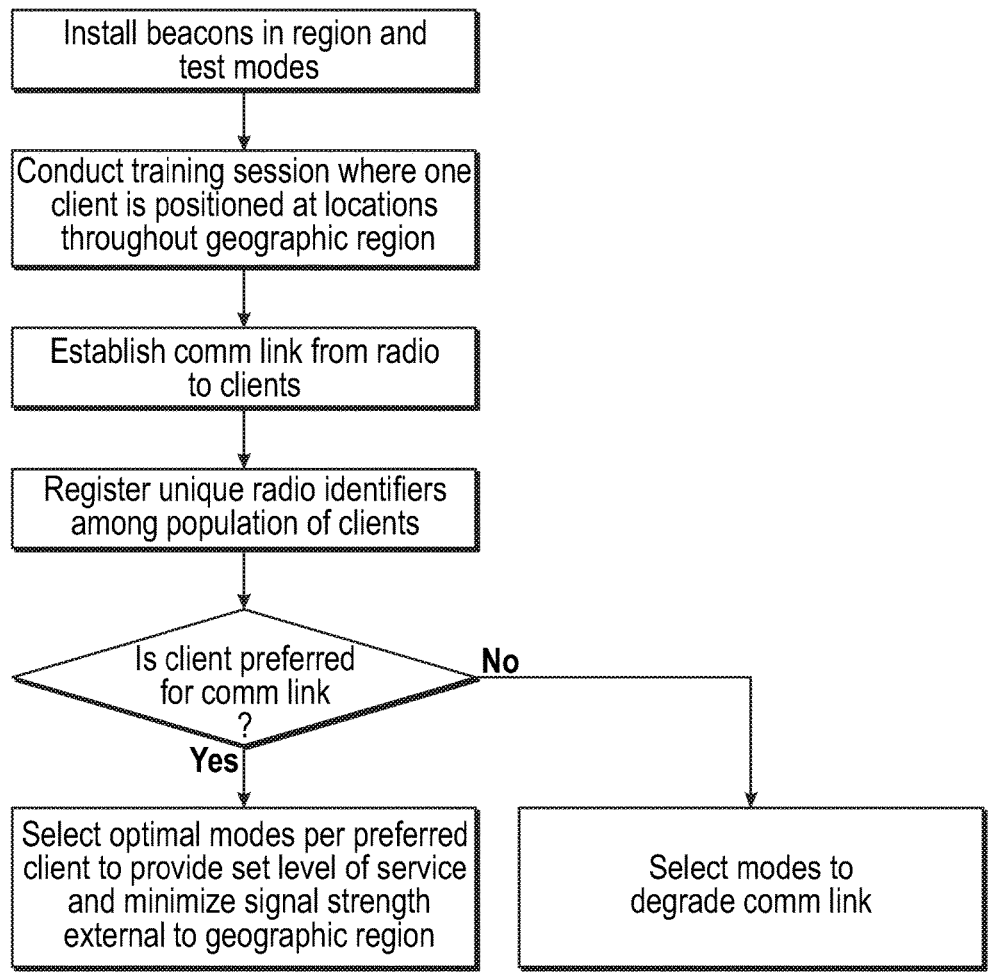
FIG. 6 shows a method for using a communication system in accordance with various embodiments described herein.

FIG. 6 illustrates a method for implementing a training session using beacon devices at fixed locations within the geographical region, describes the selection of modes for client devices in the region, and registers unique radio identifiers per client which can be used to improve or degrade communication link performance per client based on radio identifier.

The invention claimed is:

1. A communication system comprising:
a reconfigurable antenna system integrated with the communication system, the reconfigurable antenna system being capable of configuration in one selected mode selected from a plurality of possible modes, wherein the reconfigurable antenna system comprises a distinct radiation pattern when configured in each of the plurality of possible modes;
the reconfigurable antenna system being configured to transmit and receive signals with one or more client devices coupled with the communication system;
the communication system further comprising:
a processor and algorithm configured to:
establish a communication zone associated with the communication system, wherein the communication zone comprises a spatial volume surrounding the communication system and defines a perimeter within which communication with the one or more client devices is possible, and
control the selected mode of the reconfigurable antenna system, wherein the selected mode comprises a mode of the plurality of possible modes which provides optimal signal strength metric within the communication zone and minimum signal strength metric outside of the communication zone.

2. The communication system of claim 1, wherein the reconfigurable antenna system comprises a radiation pattern having a distinct shape or polarization properties in each of the plurality of possible modes.

3. The communication system of claim 1, wherein the signal strength metric comprises receive signal strength indicator (RSSI), signal to interference and noise ratio (SINR), modulation coding scheme (MCS), or channel quality indicator (CQI).

4. The communication system of claim 1, wherein the reconfigurable antenna system comprises a plurality of multi-mode reconfigurable antennas, wherein each multi-mode reconfigurable antenna is adapted to produce a distinct radiation pattern associated therewith, such that the reconfigurable antenna system is adapted to produce a plurality of radiation patterns, one for each antenna.

5. The communication system of claim 4, wherein the communication system is configured to:
   establish a communication link between the reconfigurable antenna system and each of the one or more client devices;
   generate a plurality of radiation modes of the reconfigurable antenna, and with each of the modes generated, survey the signal strength metric between the reconfigurable antenna system and each of the client devices, and
   select a mode of the reconfigurable antenna for each client device to provide a signal strength within a pre-determined range for the communication link and to minimize signal strength outside of the communication zone.

6. The communication system of claim 4, wherein the communication system is configured to establish the communication zone by implementing a training session, the training session comprising:
   establishing a communication link between the communication system and at least a first client device of the one or more client devices;
   locating the first client device at three or more positions within a confined space; and
   establishing a communication zone based on information communicated between the first client device and the communication system at each of the three or more positions.

7. The communication system of claim 6, wherein the communication system is configured to implement a selected mode for each antenna of the reconfigurable antenna system that achieves optimizes signal between the communication system and the first device when located at each of the three or more positions.

8. The communication system of claim 6, wherein the training session further comprises:
   at each of the three or more positions:
      generating a plurality of radiation modes of the reconfigurable antenna,
      with each of the modes generated, measuring the signal strength metric of the communication link,
      storing data associating the measured signal strength metric, mode of the reconfigurable antenna system, and location, and
      repeating said generating, measuring and storing at each of the three or more locations; and
   determining a mode of each reconfigurable multi-mode antenna of the reconfigurable antenna system that provides the desired signal strength metric at each position and minimizes signal strength metric outside of the communication zone.

* * * * *